May 19, 1970 — M. CAMRAS — 3,513,265

CROSS FIELD TRANSDUCER HEAD WITH HOUSING AS CROSS FIELD RETURN PATH

Filed Oct. 29, 1964 — 2 Sheets-Sheet 1

INVENTOR.
MARVIN CAMRAS

BY Hill, Sherman, Meroni, Gross & Simpson
ATTORNEYS

INVENTOR.
MARVIN CAMRAS

BY Hill, Sherman, Meroni, Gross & Simpson
ATTORNEYS 3,513,265

CROSS FIELD TRANSDUCER HEAD WITH HOUSING AS CROSS FIELD RETURN PATH

Marvin Camras, Glencoe, Ill., assignor to IIT Research Institute, Chicago, Ill., a corporation of Illinois Continuation-in-part of applications Ser. No. 126,121, July 24, 1961, Ser. No. 344,075, Feb. 11, 1964, Ser. No. 389,021, Aug. 12, 1964, and Ser. No. 401,832, Oct. 6, 1964. This application Oct. 29, 1964, Ser. No. 407,402
Int. Cl. G01d *15/12;* G11b *5/20*
U.S. Cl. 179—100.2 19 Claims

ABSTRACT OF THE DISCLOSURE

A magnetic transducer head having a magnetic core and having a housing enclosing the core except at the coupling gap, windings in the housing establishing the usual longitudinal field, and also a cross field whose return path is through the housing. A cross field defining member at the opposite side of the tape is optional.

The present application is a continuation-in-part of my copending applications Ser. No. 126,121 filed July 24, 1961, now Pat. No. 3,334,192, Ser. No. 344,075 filed Feb. 11, 1964, Ser. No. 389,021 filed Aug. 12, 1964 now Pat. No. 3,469,037 and Ser. No. 401,832 filed Oct. 6, 1964 and entitled "Transducer System."

The present invention relates to a magnetic transducer head and particularly to a transducer head capable of recording and playing back wide band signals such as broadcast television signals.

It is an object of the present invention to provide a transducer head having a wide band response characteristic so as to be capable of transducing wide band signals such as broadcast television signals.

It is another object of the present invention to provide a combined record-playback head capable of both recording and playing back wide band signals.

It is a further object of the present invention to provide a magnetic recording head capable of supplying an effective high frequency bias field having a frequency of 2 megacycles per second or higher.

It is still another object of the present invention to provide an improved cross field head capable of recording signals of the order of 1 megacycle or higher.

It is yet another object of the present invention to provide a cross field head of simplified construction.

Still other and further objects and features of the invention relate to improved shielding, cross talk reduction and improved high frequency response in a magnetic transducer head and provision for rendering the head effective in each of two opposite directions of movement of the magnetic record medium thereacross where desired.

It is also an important object of the present invention to provide an improved magnetic transducer head assembly providing higher resolution, better frequency response and less distortion at very low speeds or in high frequency applications.

Still another and further object of the present invention is to provide a relatively simple and inexpensive transducer head for high density recording or playback applications.

A further object of the invention is to provide a longitudinal scan type video recording and/or playback system providing a relatively long playing time for a given length and width of magnetic record medium.

Another object of the invention is to provide a video transducing system providing reduced noise and improved picture quality on playback.

Yet another object of the present invention is to provide a cross field head assembly in which hum-bucking is provided during playback operation.

A more specific object of the present invention is to provide a novel transducer system in which the intelligence applied to the head may be received directly from a commercially available television set, and in which the playback signal from the transducer system may be applied to the same or a different commercially available television set.

Other objects, features and advantages of the present invention will be apparent from the following detailed description taken in connection with the accompanying drawings, in which.

Figures 7, 8, 9:
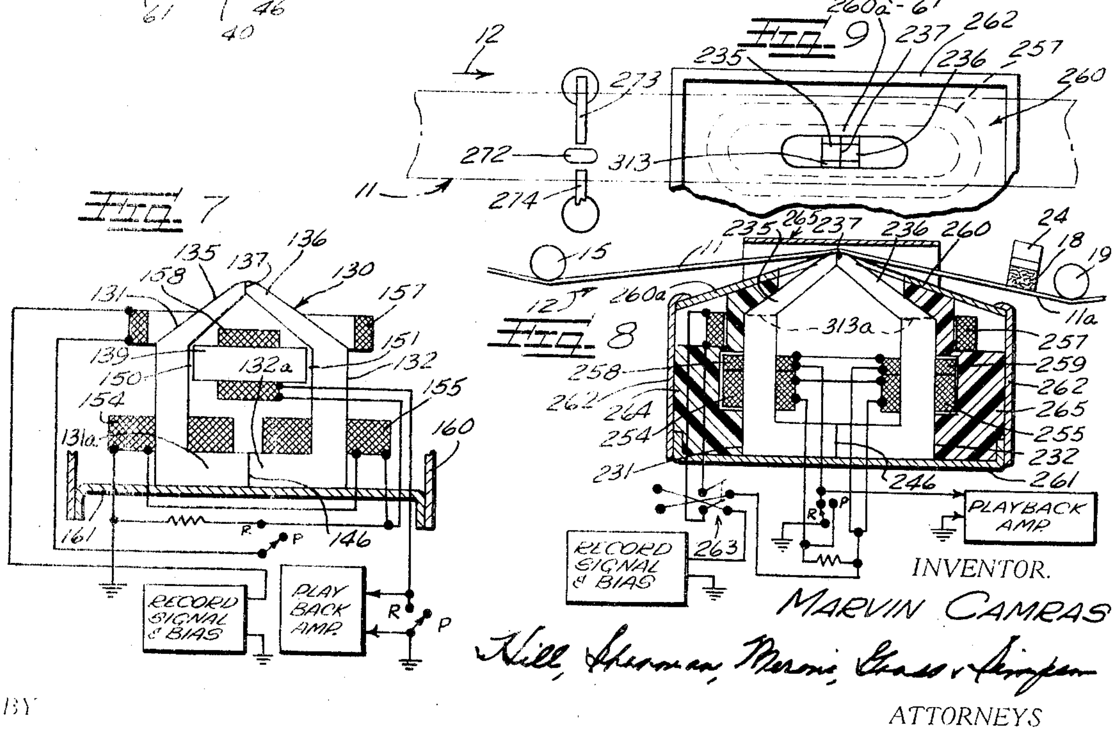
Figure 5:
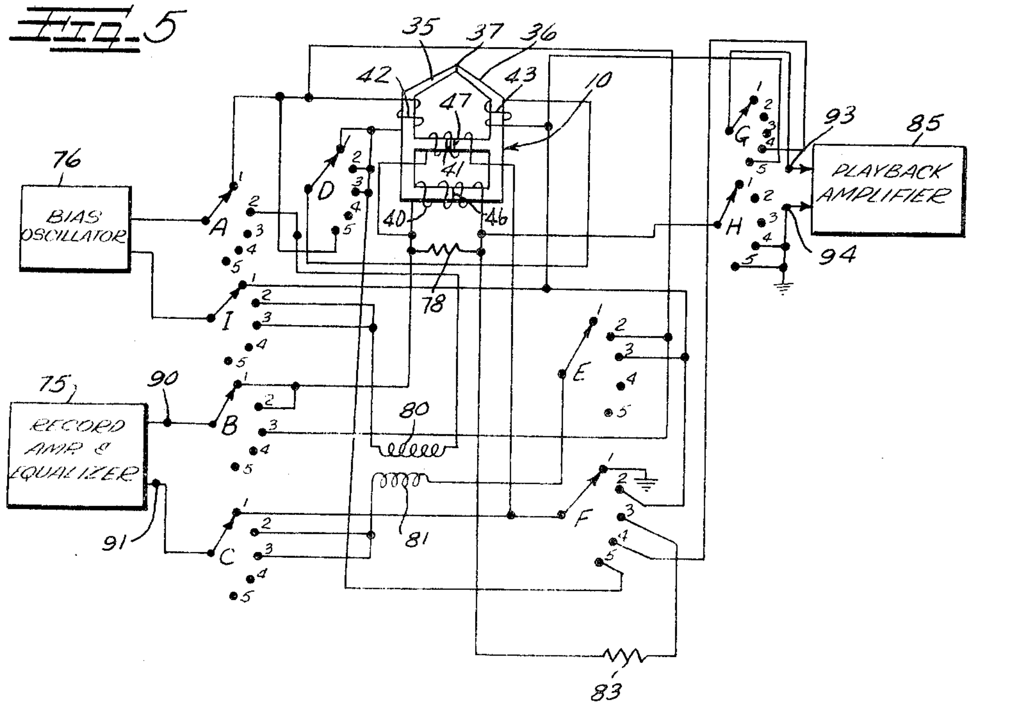
FIG. 5 illustrates an electric circuit for association with the head assembly of FIGS. 1–3 and 4 or 4A.
Figure 6:
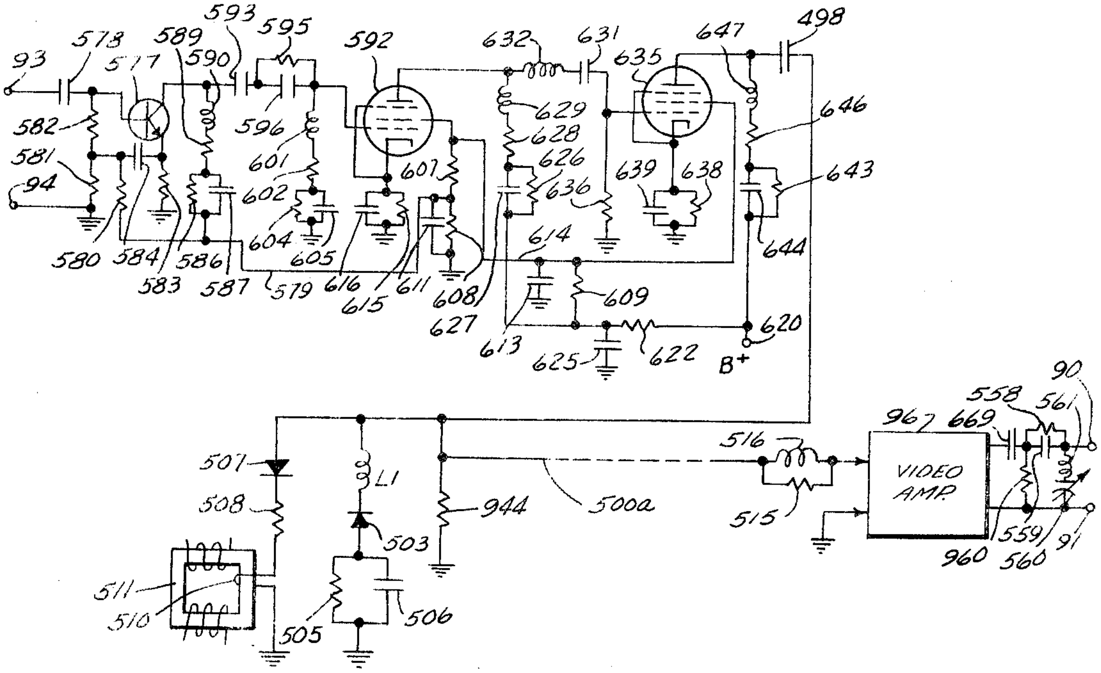

FIG. 6 gives illustrative circuit details for the system of FIG. 5;

FIG. 7 is a somewhat diagrammatic elevational view of a modified transducer head construction with certain parts broken away and shown in section;

FIG. 8 is a vertical sectional view illustrating somewhat diagrammatically a further modification of the magnetic transducer head assembly of the present invention; and FIG. 9 is a fragmentary plan view of the structure of FIG. 8.

Figure 1:
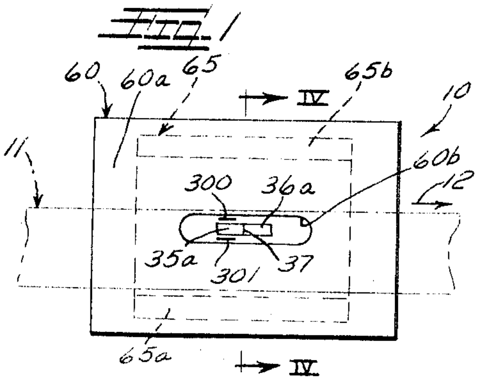
FIG. 1 is a somewhat diagrammatic plan view of a transducer head assembly in accordance with the present invention.
Figure 2:
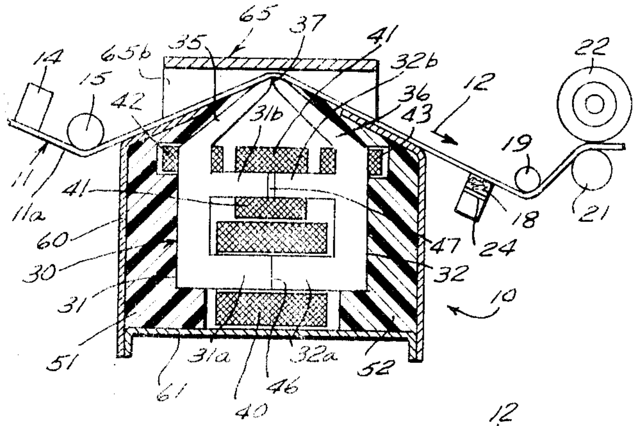
FIG. 2 is a somewhat diagrammatic vertical sectional view of the head assembly of FIG. 1 and illustrating other components of a transducer system associated with the head.
Figure 3:
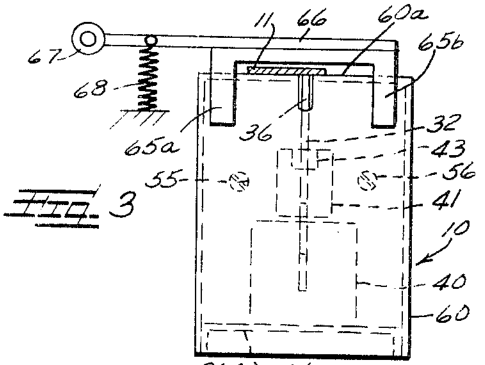
FIG. 3 is a somewhat diagrammatic end elevational view of the head assembly of FIG. 2.

Referring to FIGS. 1–3, the reference numeral 10 designates a magnetic transducer head assembly in accordance with the present invention. A magnetic tape record medium 11 is illustrated as moving along a record medium path, for example in the direction of arrow 12, successively past an erase head 14, a guide pin 15, the transducer head assembly 10, a damping pad 18, a guide pin 19, and a capstan 21 and pressure roller 22. The damping pad 18 may be made of felt impregnated with graphite and molybdenum disulfide and may be mounted on a bracket 24 in a position such that the span of tape between the head assembly 10 and the pin 19 is held against pad 18 with sufficient pressure to damp any vibration of this span of tape. The tape record medium 11 may be commercially available high grade audio or instrument tape comprising a backing strip of non-magnetic material having a layer at the side 11*a* thereof of magnetizable particles in a non-magnetic binder. The tape 11 may have a width of ¼ inch, for example, so as to accommodate a plurality of side by side channels which may be successively scanned by the head assembly 10. The tape transport mechanism and the head indexing mechanism may correspond to that illustrated in my copending applications Ser. No. 389,021 filed Aug. 12, 1964 and Ser. No. 401,832 filed Oct. 6, 1964, and the disclosures of said copending applications are incorporated herein by reference in their entirety.

The head assembly 10 comprises a magnetic core generally designated by the reference numeral 30 including core sections 31 and 32 having respective pole pieces 35 and 36. The pole pieces 35 and 36 have confronting pole tips defining therebetween a coupling means 37 in the form of a non-magnetic gap. The polar faces 35*a* and 36*a* of the pole pieces 35 and 36 project into sliding contact with the active undersurface 11*a* of the tape 11. The core 30 may be of laminated construction as indicated in FIG. 1 and may have an overall thickness less than the width of one channel of the record medium 11.

In the illustrated embodiment, the magnetic core 30 provides two loop magnetic flux paths including the coupling means 37, the first path including core portions 31*a* and 32*a* and the second magnetic flux path including core portions 31*b* and 32*b*. The core portions 31*a* and 32*a* of the first flux path are separate from the second flux path, and the core portions 31*b* and 32*b* of the second flux path are separate from the first flux path. A first winding 40 links the core portions 31*a* and 32*a* while a second winding 41 links the core portions 31*b* and 32*b*. Further windings 42 and 43 are on the pole pieces 35 and 36, respectively, and link both the first and second magnetic flux paths. The core portions 31*a* and 32*a* are illustrated as being in abutting relation to define a relatively low reluctance gap 46, while the core portions 31*b* and 32*b* are spaced to define a gap 47 of substantially higher reluctance.

The core sections 31 and 32 are shown as mounted in blocks 51 and 52 of non-magnetic electrically conductive material such as brass. The core sections 31 and 32 are mounted in the respective individual blocks 51 and 52 with the windings 42 and 43 in place, after which the faces of the pole pieces 35 and 36 defining the gap 37 are lapped to provide the desired accurate gap defining faces for the assembled head. After the gap defining faces have been polished to the desired degree of accuracy, a gap spacer is placed between the gap defining faces as the core sections 31 and 32 are placed in confronting relation as shown in FIG. 2 with windings 40 and 41 placed on portions 31*a*, 32*a* and 31*b*, 32*b*, respectively. The blocks 51 and 52 are then secured together by means of screws such as indicated at 55 and 56 in FIG. 3.

The resulting subassembly is then enclosed by means of housing parts 60 and 61 of magnetically soft shielding material. The shielding part 60 provides a broad smooth tape engaging surface 60*a* which is designed to be in sliding contact with the magnetizable surface 11*a* of the tape at the inactive channels thereof in all lateral positions of the tape relative to the magnetic core 30. In the embodiment shown in FIG. 2, the tape active surface is in contact with the keeper surface 60*a* of the housing part 60 over substantially the entire portion of the tape path where the tape is crossing the head assembly 10 but the tape may engage the keeper surface 60*a* only in the region laterally aligned with pole pieces 35 and 36 as indicated in FIG. 8, if desired. As best seen in FIG. 1, the keeper surface 60*a* has an elongated opening 60*b* therein through which the pole faces 35*a* and 36*a* of the core project with a slight spacing between the core 30 and the laterally adjacent edges of the opening 60*b*. The extent of the gaps at each lateral side of the core between the core and the housing 60 substantially exceed the extent of the gap 37 so that the path for magnetic flux across the gap 37 in the plane of the core 30 is substantially shorter than the reluctance of flux paths between the pole pieces 35 and 36 which thread the housing part 60.

In the illustrated embodiment, there is shown an additional member 65 of magnetic material which extends in close proximity to the polar faces 35*a* and 36*a* for defining what may be termed a cross field extending generally normal to the pole faces 35*a* and 36*a* at the region adjacent the coupling means 37. The member 65 is shown as lying closely adjacent the path but providing a slight clearance gap from the inactive surface of the tape 11. As best seen in FIGS. 3 and 4, the member 65 may have legs 65*a* and 65*b* with edge faces in conforming contact with the keeper surface 60*a* of housing part 60. Preferably the member 65 is of non-metallic magnetically soft material such as ferrite. Preferably, the edge faces of the legs 65*a* and 65*b* are in continuous contact with the keeper surface 60*a* over the entire length of the member 65 so as to tend to shield the pole faces 35*a* and 36*a* from extraneous magnetic fields. The cross section of the member 65 at the region directly over the coupling means 37 is shown in FIG. 4. The member 65 may be provided with a mounting arm 66 which is pivotal about a pin 67 so as to allow convenient retraction of the member 65 from the record medium path for the purpose of threading the record medium across the head. Suitable spring means may urge the arm 66 in the clockwise direction in the operative position shown in FIG. 3 so as to firmly hold the member 65 in engagement with the keeper surface 60*a* of the housing during a scanning operation of the tranducer head 10. The member 65 may be automatically pivoted to a retracted position against the action of this spring when the transducer system is placed in the load condition. A tension spring 68 is diagrammatically indicated in FIG. 3 as urging the member 65 in the clockwise direction about pivot pin 67 in the operating condition of the system.

Figure 4A:
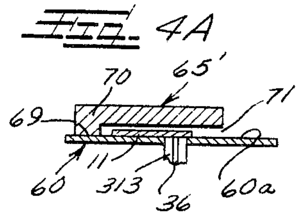
FIG. 4A is a transverse sectional view similar to FIG. 4 but showing a further modified construction.
Figure 4:
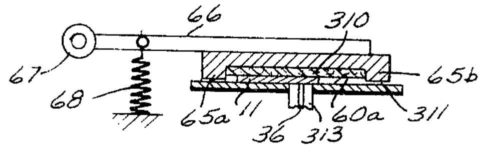
FIG. 4 is a fragmentary transverse sectional view taken generally along the line IV—IV of FIG. 1 but showing a modified construction.

Alternatively as illustrated in FIG. 4A, a member 65′ may be provided directly secured to the housing 60 at the region 69 where a leg 70 similar to the leg 65*a* in FIG. 4 engages the keeper surface 60*a*. The member 65′ is spaced from the keeper surface 60*a* at the side thereof opposite the leg 70 so as to provide for loading of the tape 11 edgewise into the slot 71. In other words the leg 65*b* of the member 65 is omitted in the alternative construction of FIG. 4A so that the member 65′ may conveniently be fixedly secured to the housing 60.

FIG. 5 illustrates exemplary recording and playback circuitry for the head assembly 10 of FIGS. 1–3 and 4 or 4A. The illustrated circuitry comprises a series of nine 5-position selector switches A through I which may be assumed to be ganged for conjoint manual actuation to any one of positions 1 through 5 of the respective switches. In selector switch positions 1 through 3, the head assembly 10 is operated in the recording mode to record a signal from a recording amplifier and equalizer component 75. In each of these selector switch positions a bias oscillator component 76 provides high frequency bias current preferably having a frequency of at least one megacycle per second. In the illustrated circuitry, a resistor 78 is shown connected across the terminals of winding 40 of the head assembly 10.

In the first selector switch position which is the one illustrated in FIG. 5, high frequency bias current is supplied to the windings 42 and 43 so as to produce high frequency bias fluxes which are opposed with respect to the gap 37. A principal flux path for the high frequency bias flux thus extends from the respective pole faces 35*a* and 36*a*, FIG. 1, through the tape thickness to the member 65 or 65′ and then through the legs 65*a* and 65*b* to the housing part 60. The high frequency bias flux paths then extend from the housing part 60 to the core 30 at the portion thereof below the windings 42 and 43. This bias frequency magnetic field pattern in the region of the trailing pole face 36*a* is termed a cross field, herein, irrespective of whether there is an additional bias frequency field component of substantial amplitude extending across the gap 37 between the pole pieces 35 and 36.

In order to provide a bias frequency field component across the gap 37 having an amplitude comparable to the amplitude of the cross field component at the trailing side of the gap, it is contemplated that the windings 42 and 43 may have unequal numbers of turns or may otherwise be unbalanced.

Where the tape 11 is to be subject to a transducing operation in each of the opposite directions of movement thereof, the numbers of turns of the windings 42 and 43 may be changed by suitable switching means depending upon the direction of movement of the tape. Thus one of the windings would predominate in one direction of movement of the record medium and the other winding would predominate in the opposite direction of movement of the record medium so as to provide recording field configurations of bias frequency as illustrated in my prior Pat. No. 2,803,708 issued Aug. 20, 1957. An important advantage of the present cross field arrangement as compared to that of my prior patent resides in the fact that while the cross field windings such as 42 and 43 are on the same side of the record medium as the head assembly 10, the magnetic core 30 of the head need only have two poles protruding from the shielding case 60 for the head. A third pole laterally adjacent polar faces 35*a* and 36*a* would require a larger opening 60*b* and thus reduce the effectiveness of the keeper surface 60*a* in preventing cross talk from adjacent channels of the record medium. A third pole spaced longitudinally of the polar faces 35*a* and 36*a* with respect to the direction of tape movement would also require a larger area for the opening 60*b* and thus expose the head to spurious magnetic fields. Further, it is highly convenient to have a core 30 of the simplicity illustrated in FIGS. 1–3 wherein two core sections and only two core sections may be polished at the gap faces and then assembled to provide the complete core construction having only a single gap for coupling to the record medium.

In the number one position of the selector switches shown in FIG. 5, the recording amplifier and equalizer component across the gap 37 may be reversed by suitable produce a signal magnetic field across the gap 37 The resistor 78 is selected to minimize the effect of the winding 40 on the recording characteristics of the head assembly as described in my aforementioned copending applications Ser. No. 389,021 and Ser. No. 401,832.

In the number two position of the selector switches, the bias oscillator 76 is connected to a primary winding 80 so as to couple bias frequency energy to a secondary winding 81 which is in series with the record amplifier component 75. Thus in the No. 2 selector switch position, the bias frequency is superimposed on the signal and the composite resultant current is supplied to windings 41, 42 and 43 in series. With the illustrated arrangement, the high frequency and signal frequency M.M.F.'s produced by winding 43 are opposed with respect to the corresponding M.M.F.'s of windings 41 and 42 so as to provide a cross field component at both the bias frequency and the signal frequency at the trailing side of the gap 37. The resultant signal and bias fields are as illustrated in my Pat. No. 2,803,708.

In the number three position of the selector switches in FIG. 5, superimposed bias and signal current is supplied to the windings 42 and 43 so as to produce signal and bias frequency magnetomotive forces in the pole pieces 35 and 36 which are opposed with respect to the gap 37. A resistor 83 is connected in series with the resistor 78 across the winding 41. The windings 42 and 43 are preferably unbalanced so as to provide a resultant bias and signal field as disclosed in my Pat. No. 2,803,708. In each of the recording circuits illustrated in FIG. 5, the phase of the cross field components relative to the component across the gap 37 may be reversed by suitable switching of the number of turns or polarity of the windings 42 and 43 (or 41 for the second described recording circuit) so as to provide the desired recording field configuration in each direction of movement of the record medium.

In each of the illustrated recording circuits, coils 42 and 43 may be small enough to allow a bias frequency of several megacycles per second to be used effectively. For example, winding 42 may have twenty turns and winding 43 may have fifteen turns. For the reverse direction of operation of the record medium, winding 42 may have fifteen turns and winding 43 may have twenty turns. If used in conjunction with another winding, windings 42 and 43 may both have an equal number of turns. By way of example, winding 41 may have 150 turns and winding 40 have 1500 turns.

In the first playback condition of FIG. 5 with the selector switches in position number 4, windings 42 and 43 are unconnected and windings 40 and 41 are connected in series across the input to playback amplifier 85. By way of example, at low frequencies below the resonant frequency of the coil 40, most of the signal flux from the record medium which is coupled to the head at the gap 37 threads the coil 40 since the first flux path including core portions 31*a* and 32*a*, FIG. 2, has a smaller non-magnetic gap than the second flux path including core portions 31*b* and 32*b*. Above the resonant frequency of coil 40, the parallel capacitance of coil 40 makes it act as a shorted winding, opposing the flux through the first flux path. Thus for signal frequency components above the resonance frequency of coil 40, the principal flux path is the second flux path through core portions 31*b* and 32*b* which threads coil 41 which has fewer turns and a higher resonant frequency. At frequencies below the resonant frequency of coil 40, coils 40 and 41 are shown as connected in series opposing relationship with respect to the input to amplifier 85. Coils 40 and 41 when connected as described provide a wider response band overall as has been described in my copending applications Ser. Nos. 344,075, 389,021 and 401,832. The disclosure of each of these copending applications is incorporated herein by reference in its entirety.

In the second playback condition with the selector switches in the fifth position in FIG. 5, windings 40, 41, 42 and 43 are connected in series across the playback amplifier 85. The coils 42 and 43 are in series aiding relation with respect to the coil 41 so as to provide increased playback voltage to the amplifier 85 at frequencies above the resonant frequency of coil 40.

FIG. 6 illustrates a detailed electric circuit for utilization in FIG. 5. The reference numerals in FIG. 6 correspond to those of my copending application Ser. No. 401,832, and exemplary values of the various components have been given in said copending application. The description of the circuit in said copending application is incorporated herein by reference in its entirety. As is clear from said copending application, inductor 499 in FIG. 6 may have a value of 6.2 millihenries.

To correlate FIGS. 5 and 6, corresponding circuit points 90 and 91 for the recording circuit have been illustrated in FIGS. 5 and 6, and corresponding circuit points 93 and 94 for the playback circuits have been indicated in FIGS. 5 and 6. Thus, the selector switches B and C in FIG. 5 would have their movable selector arms connected to terminals 90 and 91 of FIG. 6 during recording with the signal to be recorded being supplied by a video amplifier component 96. During playback, selector switches G and H would be connected to circuit points 93 and 94 in FIG. 6 so as to supply the reproduced video signal via the playback circuitry illustrated in FIG. 6 to the input of the video amplifier 96. As illustrated in said copending application Ser. No. 401,832, during recording, an input to the video amplifier 95 may be connected to receive a broadcast television signal, while during playback, the output of the video amplifier 96 may supply the reproduced video signal to the television set for visual display to the exclusion of any broadcast television signal to which the set would otherwise be tuned.

The audio signal component of a broadcast television signal may be recorded along with the picture component by means of the head assembly 10 utilizing any of the circuits of my copending application Ser. No. 393,282 filed Aug. 31, 1964. The disclosure of this copending application is incorporated herein by reference in its entirety.

FIG. 7 illustrates a modified core construction for the head assembly of FIGS. 1–3 and 4, or 4A. In this embodiment the magnetic core 130 comprises a pair of core sections 131 and 132 having respective pole pieces 135 and 136 defining a coupling means 137. A first loop magnetic flux path includes core portions 131*a* and 132*a* while a second magnetic flux path includes a core piece 139 which is preferably of material to present a relatively low loss at high frequencies such as a ferrite material or fine laminations of a metallic magnetic material. The core portions 131*a* and 132*a* abut at a gap or interface of relatively low reluctance while the core piece 139 may be spaced from core sections 131 and 132 to provide non-magnetic gaps 150 and 151 of substantially higher reluctance than the reluctance of interface 146.

First windings 154 and 155 are disposed in linking relation to the first magnetic flux path while a further winding 158 is disposed on the core piece 139 so as to link the second magnetic flux path.

The winding 158 may have substantially fewer turns than the windings 154 and 155. At relatively low frequencies most of the signal flux from the tape at coupling means 137 threads the large coils 154 and 155 since the first magnetic flux path has the smaller gap at 146. Above the resonant frequency of the coils 154 and 155, the parallel capacitance of the windings 154 and 155 cause them to act as shorted windings, opposing signal flux threading the first flux path. The principal flux path for signal flux then is the second flux path threading coil 158 which has a substantially higher resonant frequency. During playback, coils 154 and 155 and 158 may be connected in series with the outputs of coils 154 and 155 in aiding relation and the output of coil 158 opposing the outputs of the other coils at frequencies below the resonant frequencies of coils 154 and 155. Windings 154 and 155 may be shunted by a suitable resistance during recording and signal current and superimposed bias current may be supplied to the winding 158, for example. By placing the winding 158 relatively close to the path of the record medium at the coupling means 137 and by constructing the core part 139 of ferrite or the like, a relatively high frequency bias field may be effectively established at the coupling means 137.

If it is desired to establish opposing components of the high frequency bias M.M.F. with respect to the coupling means 137 so as to establish a cross field component of the bias field, a bias winding may be disposed as indicated at 157 in FIG. 7. The winding 158 may supply a bias field component across the coupling means 137. The bias field component extending through the thickness dimension of the record medium may be returned in air or by means of the magnetic member 65 or 65' to the casing 160. There is a low reluctance path from casing 160 to core 130 by virtue of the contact between case member 161 of magnetic material and core portions 131*a* and 132*a*. The casing 160 may have the same configuration as casing 60 of FIGS. 1–3.

As a further alternative, megacycle bias frequencies may be introduced by means of cross field conductors extending in notches in the pole pieces 135 and 136 as disclosed in my copending applications Ser. Nos. 389,021 and 401,832.

FIG. 8 illustrates a modified head assembly for the transducer system of FIGS. 1–3 and 4 or 4A wherein the magnetic core 230 comprises a pair of core sections 231 and 232 having respective pole pieces 235 and 236 defining a coupling means 237. The first loop magnetic flux path includes an interface or gap 246 and is linked by a pair of windings 254 and 255 each having a relatively greater number of turns and by a pair of windings 258 and 259 each having a lesser number of turns. A cross field winding 257 encircles the entire core 230 with a number of turns so as to produce cross field high frequency bias magnetomotive forces in the pole pieces 235 and 236 which are in the same instantaneous direction so as to be opposed with respect to the coupling means 237. The common winding 257 is thus the same in result as individual windings on the pole pieces 235 and 236 as indicated at 42 and 43 in FIG. 2. The core 230 may be enclosed in a shielding casing formed of parts 260, 261 and 262. A reversing switch 263 is indicated for reversing the polarity of cross field winding 257 in accordance with the direction of movement of record tape 11.

In FIG. 8, the core sections 231 and 232 are shown secured to non-magnetic blocks 264 and 264*a* of cast resin such as epoxy. If metallic blocks are used, however, electrical insulating material may be provided to avoid an electrically conductive path completely about the winding 257. The magnetic member 265 in FIG. 8 may be identical to that illustrated in FIGS. 2, 4 or FIG. 4A. The upper keeper surface 260*a* may be substantially identical to the surface 60*a* shown in FIG. 1.

In both FIGS. 7 and 8, the windings 154, 155 and 254, 255 may be connected in a hum-bucking relation with respect to stray magnetic fields during playback and in this case will have equal numbers of turns. During recording, the windings 264 and 265 may receive recording current in accordance with the signal and a superimposed bias frequency component so as to provide a bias field in the direction across the coupling means 237 in addition to the bias frequency component extending through the thickness dimension of the record medium to the magnetic member 265. The cross field winding 257 may receive bias current of a frequency in the megacycle range, and the member 265 may be of ferrite material or the like as described in connection with FIGS. 1–3. Signal current as well as bias frequency current may be supplied to the cross field coil 257 if desired.

The core sections 131 and 132 or 231 and 232 may be assembled with cast resin blocks such as indicated at 264 and 264*a* and the gap faces polished prior to assembly of the two core sections in a way similar to that described with respect to FIGS. 1–3. The cross field coil 257 may be prewound and assembled after the core 230 has been assembled and prior to the assembly of the shield case 260, 261, 262.

In each of the embodiments, where the cross adjacent the coupling means at the trailing side thereof is preferably at least of the order of the coercive force of the magnetizable layer of the record medium so as to provide a substantial and effective bias amplitude. Similarly, when a component of bias field across the coupling means 37 combines with a cross field component of bias frequency, the resultant magnetic field has an amplitude in the recording region preferably at least of the order of the coercive force of the record medium. The two components of bias frequency are preferably of comparable magnitude as described in my Pat. 2,803,708 so as to provide a resultant field of substantially modified configuration as compared to the bias field across the coupling means 37 alone. The longitudinal component of the resultant field at the recording region has a much sharper gradient than the gradient of the field across the coupling means 37 by itself.

In each of the embodiments, the magnetic member 65 or 65' as shown in FIG. 2, 4 or 4A may be included, or all such members on the opposite side of the tape may be omitted relying on a return path through the casing such as 60 alone. In this event, all of the magnetic material forming the principal bias flux paths is on one side of the record medium. It will be noted that the portion 65 or 65' constitutes a passive magnetic circuit member with no winding thereon or the like and no electrical connections.

In each of the embodiments, the bias oscillator and/or the recording circuits may have an additional switch coupled to the tape drive actuator so that the bias oscillator and/or recording circuits are activated only when the tape is being driven and therefore do not interfere with direct viewing of the television set with the tape transport out of use.

In each of the embodiments, separate audio heads may may be used, providing lateral tracks as in my copending applications Ser. Nos. 344,075, 389,021 and 401,382. The audio cores may be built into the video the head, with the audio pole tips protruding in the lateral space between the video core and the permeable casing at the locations indicated at 300 and 301 in FIG. 1 Alternatively the audio tracks may be recorded and played back by an independent audio head structure to provide audio tracks on one or both sides of the video track as in said copending applications. Such an audio head is diagrammatically indicated in FIG. 9 as comprising a center pole 272 and side poles 273 and 274 defining respective spaced audio gaps located on opposite sides of the video track so as to record transversely directed audio tracks at each side of and adjacent the video track traveling over the center pole 272 of the audio head.

With respect to any of the embodiments, if the head is designed primarily for audio frequency recording, lower bias and cross field frequencies are suitable as for example 15,000 cycles per second to 200 kilocycles per second. Direct current bias (bias frequency equals zero) field component of bias frequency is utilized alone, the bias frequency amplitude in the region of the tape path may be used in any of the embodiments; or for certain applications the signal current may be applied without bias to both the signal and bias winding so as to produce a signal cross field and main field configuration as in said Pat. 2,803,708 without a superimposed bias field.

In each of the embodiments, where no bias is used, the signal alone may be applied to the coils which produce the gap field and the cross field components.

The term "high frequency bias" is utilized herein to refer to a fluctuating periodic signal having a frequency greater than the signal frequencies to be recorded, for example as described in my U.S. Pat. No. 2,351,004.

In any of the embodiments, the magnetic return circuit member such as 65 may have a layer of resilient material such as felt or cork as indicated at 310 in FIG. 4 for the member 65. In this case, spring 68 serves to urge the resilient backing material 310 against the inactive surface of the tape so as to press the tape against the pole faces of the head over the region at the gap 27 and on each side thereof. In this event, there is a slight clearance space as indicated at 311 between the member 65 and the surface 60*a* of the casing.

The cross field and the wide-band features are usable separately. Thus one may have a wide-band head of this design, with cross field omitted; and vice versa.

In FIGS. 3, 4, 4A, and 9, electrically conductive nonmagnetic side plates such as 313 are indicated. A lower margin of a plate 313 is indicated at 313*a* in FIG. 8. The plates 313 may conform to the pole pieces in configuration.

Portions 65 and 65′ may be omitted in some designs, relying on the flux pattern from the head core to the casing to supply the *x*-field (cross field) component; which will not be as uniform or as strong as if 65 or 65′ are used. This gradient of the *x*-field from the edge of the recording head core toward its center is beneficial in providing an extended recording range because of the variation in bias and/or signal.

To reduce the side components of magnetic flux, the area between the pole tips and the casing sides is made small by using a steeper slope on 35, 36 (FIG. 1) than on the upper face of the casing, and the upper face of the casing may be very thin as for example 0.002 inch. The casing may be formed of "Permalloy" or (especially for high frequency use) of magnetic ferrite, and may be built up of several components of similar or different material. FIG. 8 shows a separate top plate 260. For highest frequency applications the core structure may also be of ferrite.

The casing 60 provides a path for the vertical or *x*-field component of magnetic flux, which combines with the generally semi-circular flux of the main head gap to give a sharper field gradient. The casing also acts as a keeper to bypass the flux from adjacent channels on the tape, preventing cross-talk. It also shields the head from hum and stray fields.

Referring to FIG. 2, where mounting blocks 51 and 52 are of plastic, it is preferred that the plastic not contact the tape. A preferred arrangement is thus indicated in FIG. 8 with respect to blocks 264 and 265. Where blocks 51 and 52 are of non-magnetic metal, however, they may extend to form part of the tape contacting surface as shown in FIG. 2.

Referring to FIG. 1, where audio poles 300 and 301 are used, their upper faces may form part of the tape contacting surface and are preferably closer to video pole piece face 35*a* than to the tape contacting surface 60*a*.

The housing parts 60, 61, 65, 65′, 160, 161, 260, 261, 262 and 265 are hereby each specifically disclosed as being of a magnetically soft ferrite material as one form of the present invention. Also any number less than all of said parts may be of ferrite material or other nonmetallic high resistivity magnetically soft material.

The electric circuits shown herein are hereby specifically disclosed in association with the head assemblies of each of the copending applications Ser. No. 126,121, Ser. No. 344,075, Ser. No. 389,021 and Ser. No. 401,832. The head assemblies shown herein are hereby specifically disclosed in association with the electric circuits of each of said copending applications. The disclosures of my copending applications Ser. No. 835,017 filed Aug. 20, 1959, now Pat. No. 3,382,325, Ser. No. 47,741 filed Aug. 5, 1960, now abandoned, Ser. No. 126,121 filed July 24, 1961, Ser. No. 178,293 filed Mar. 8, 1962, now Pat. No. 3,382,326, Ser. No. 344,075 filed Feb. 11, 1964, Ser. No. 350,514 filed Mar. 9, 1964, Ser. No. 389,021 filed Aug. 12, 1964, now Pat. No. 3,469,037, Ser. No. 393,282 filed Aug. 31, 1964 and Ser. No. 401,832 filed Oct. 6, 1964 are specifically incorporated herein by reference in their entireties and particularly for the purpose of illustrating alternative constructions within the scope of certain broad concepts of the present invention.

It will be apparent that modifications and variations may be effected without departing from the scope of the novel concepts of the present invention.

I claim as my invention:

1. A magnetic transducer system comprising a magnetic head including a magnetic core having a record medium path thereacross and having a pole structure with coupling means on one side of the record medium path for coupling of the core to a magnetic record medium traveling along the record medium path, and said head having a bias frequency loop magnetic flux path threading a recording region of the record medium path adjacent said coupling means, winding means linking said bias frequency loop magnetic flux path and disposed on the same side of the record medium as said coupling means, means for energizing said winding means to produce a bias frequency magnetic flux threading said loop magnetic flux path, a housing of magnetic material having said magnetic core and said winding means therein and having an extended smooth record medium-engaging surface with an aperture therein through which the pole structure of said magnetic core projects, said housing providing a substantial portion of said bias frequency loop magnetic flux path, and means of magnetic material providing a portion of said loop magnetic flux path and being so disposed on the opposite side of said record medium path from said coupling means and of such a permeability at said bias frequency as to provide a bias frequency magnetic field of substantial amplitude at said recording region in the path of said record medium adjacent said coupling means.

2. A magnetic transducer system comprising a magnetic transducer head including a magnetic core having a record medium path thereacross and having poles on one side of the record medium path defining therebetween a coupling means for coupling of the poles to a magnetic record medium traveling along said record medium path, and said head having a bias frequency loop magnetic flux path including at least one of said poles and threading a recording region in said record medium path adjacent said coupling means, winding means linking said bias frequency loop magnetic flux path and disposed on the same side of the record medium as said poles, means for energizing said winding means to produce a bias frequency magnetic flux threading said loop magnetic flux path, and a housing of magnetic material having said winding means therein and having an aperture through which the poles project and having a broad smooth record medium contacting surface laterally adjacent said poles for engaging the record medium over an extended surface thereof adjacent said poles, and said housing providing a substantial portion of said bias frequency loop magnetic flux path, the reluctance of said bias frequency loop magnetic flux path including said housing being such at the bias frequency that a bias frequency field of substantial amplitude is produced in the recording region of said recording medium path adjacent said coupling means.

3. A magnetic transducer system comprising a magnetic transducer head having a record medium path thereacross and having a pair of pole pieces on one side of the record medium path defining therebetween a coupling means for coupling of the pole pieces to a magnetic record medium travelling along the record medium path, a pair of bias frequency windings each linking one of said pole pieces, means for energizing said windings to supply bias frequency magnetomotive forces to said pole pieces which are instantaneously opposed with respect to said coupling means, and a housing of magnetic material having said pole pieces and said pair of bias frequency windings therein and having an aperture therein to expose the pole pieces to the record medium at said coupling means, said housing providing a return path for bias frequency magnetic flux produced by said bias frequency magnetomotive forces.

4. A magnetic transducer system comprising a magnetic transducer head having a record medium path thereacross and having a coupling means for coupling of the transducer head to a magnetic record medium traveling along the record medium path at a recording region of the path and having respective bias frequency loop magnetic flux paths at respective opposite sides of the coupling means, one only of said bias frequency loop magnetic flux paths threading said recording region, winding means linking said bias frequency loop magnetic flux paths and disposed on the same side of the record medium as the coupling means, means for energizing said winding means to produce bias frequency magnetomotive forces in the respective bias frequency loop magnetic flux paths which are opposed with respect to the direction across said coupling means and longitudinally of the record medium path, and a housing of magnetic material substantially enclosing said head except at said coupling means and providing a substantial portion of each of said bias frequency loop magnetic flux paths.

5. A magnetic transducer system comprising a magnetic transducer head having a record medium path thereacross and having a pair of pole pieces on one side of the record medium path defining therebetween a coupling means for coupling of the pole pieces to a magnetic record medium traveling along the record medium path at a recording region of the record medium path, a bias frequency winding linking each of said pole pieces, means for energizing said bias frequency windings to produce bias frequency magnetomotive forces in the respective pole pieces which are opposed with respect to the direction across the coupling means, and said bias frequency windings alone when energized by said energizing means providing for a substantial unbalance in the amplitudes of the bias frequency magnetomotive forces applied to the pole pieces to provide a net component of bias frequency magnetic flux across said coupling means of substantial magnitude due solely to the energized bias frequency windings.

6. A magnetic transducer system comprising a magnetic transducer head having a coupling means for coupling thereof to a magnetic record medium and having first and second loop magnetic flux paths each including said coupling means, first and second winding means linking said first and second loop magnetic flux path, respectively, third and fourth winding means coupled in common to said first and second loop magnetic flux path and disposed at opposite sides of said coupling means, means for energizing said second winding means with a signal current during recording and for supplying a high frequency bias current to said third and fourth winding means during recording to produce opposed bias frequency magnetomotive forces which are opposed with respect to the direction across said coupling means, and means for connecting said first and second winding means in common to a playback circuit during playback.

7. A magnetic transducer system comprising a magnetic transducer head having a coupling means for coupling thereof to a magnetic record medium and having first and second loop magnetic flux paths each including said coupling means, first and second winding means linking said first and second loop magnetic flux path, respectively, bias winding means coupled to said first and second loop magnetic flux paths for producing bias frequency magnetomotive forces in said flux paths which are substantially in phase and opposed with respect to the direction toward said coupling means to provide a substantial bias frequency field component in the direction through a recording region of the path of the record medium adjacent said coupling means, means for energizing said second winding means with a signal current during recording, and means for connecting said first and second winding means in common to a playback circuit during playback.

8. A magnetic transducer system comprising a magnetic head including a magnetic core with a pair of pole pieces having a record medium path thereacross and having coupling means for coupling of the core to a magnetic record medium traveling along the record medium path at a recording region thereof and having a cross field loop magnetic flux path including at least one of said pole pieces and said recording region, winding means linking said cross field loop magnetic flux path and disposed on the same side of the record medium as said coupling means, means for energizing said winding means to produce magnetic flux threading said cross field loop magnetic flux path, a housing of magnetic material substantially enclosing said magnetic core except at the coupling means and providing a substantial portion of said cross field loop magnetic flux path, and passive magnetic circuit means of magnetic material free of windings providing a portion of said loop magnetic flux path and being so disposed on the opposite side of said record medium path from said coupling means and of such a permeability as to provide a cross field component of substantial amplitude at said recording region.

9. A magnetic transducer system comprising a magnetic transducer head having a record medium thereacross and having pole portions on one side of the record medium path defining therebetween a coupling means for coupling of the pole portions to a magnetic record medium traveling along said record medium path and having a cross field loop magnetic flux path including at least one of said poles and a recording region in said record medium path adjacent said coupling means, winding means linking said cross field loop magnetic flux path and disposed on the same side of the record medium as said pole, means for energizing said winding means to produce a magnetic flux threading said loop magnetic flux path, and a housing enclosing said head except at said coupling means and providing passive magnetic circuit means of magnetic material free of windings disposed along the record medium path and having a broad smooth record medium contacting surface laterally adjacent said poles for engaging the record medium over an extended surface thereof adjacent said poles, and said means of magnetic material providing a portion of said cross field loop magnetic flux path, the reluctance of said cross field loop magnetic flux path including said passive magnetic circuit means being such that a cross field component of substantial amplitude is produced in the recording region of said path of the record medium adjacent said coupling means.

10. A magnetic transducer system comprising a magnetic transducer head having a record medium path thereacross and having a pair of pole pieces on one side of the record medium path defining therebetween a coupling means for coupling of the pole pieces to a magnetic record medium traveling along the record medium path, a pair of cross field windings each linking one of said pole pieces, means for energizing said cross field windings to supply magnetomotive force components to said pole pieces which are instantaneously opposed with respect to said scanning means for producing a substantial cross field component in said record medium path adjacent said coupling means, and a housing of magnetic material substantially enclosing said head except at said coupling means and providing a return path for cross field magnetic flux produced by said cross field windings.

11. A magnetic transducer system comprising a magnetic transducer head having a record medium path thereacross and having a coupling means for coupling of the transducer head to a magnetic record medium traveling along the record medium path at a recording region of the path and having respective signal frequency loop magnetic flux paths at respective opposite sides of the coupling means, one only of said signal frequency loop magnetic flux paths threading said recording region, winding means linking said signal frequency loop magnetic flux paths and disposed on the same side of the record medium as the coupling means, and means for energizing said winding means with a signal current corresponding to a signal to be recorded to produce signal frequency magnetomotive force components in the respective signal frequency loop magnetic flux paths which are opposed with respect to the direction across said coupling means and longitudinally of the record medium path.

12. A magnetic transducer system comprising a magnetic transducer head having a record medium path thereacross and having a pair of pole pieces on one side of the record medium path defining therebetween a coupling means for coupling of the pole pieces to a magnetic record medium traveling along the record medium path at a recording region of the record medium path, a signal frequency winding linking each of said pole pieces, means for energizing said signal frequency windings with a current varying in accordance with a signal to be recorded to produce signal frequency magnetomotive force components in the respective pole pieces which are opposed with respect to the direction across the coupling means, and means providing for a substantial unbalance in the amplitudes of the signal frequency magnetomotive force components applied to the pole pieces to provide a net component of signal frequency magnetic flux across said coupling means.

13. A magnetic transducer system comprising a magnetic head comprising a magnetic core with a pair of poles and a record medium path extending in coupling relation with said poles, said poles having a recording region of the record medium path adjacent one of the poles and having coupling means for coupling of the core to a magnetic record medium traveling along the record medium path at said recording region during a recording operation of said head, signal input means for coupling to said core to produce a magnetic signal field in said recording region of amplitude to be recorded on said record medium during said recording operation, said head having a bias frequency loop magnetic flux path threading said recording region of the record medium path and said one of said poles, electrically conductive path means linking said bias frequency loop magnetic flux path, means for energizing said electrically conductive path means to produce a bias frequency magnetic flux threading said loop magnetic flux path, and a housing of magnetic material having said magnetic core therein and having an opening for exposing said poles to the record medium path, said housing of magnetic material providing a substantial portion of said loop magnetic flux path and being so disposed and of such permeability as to provide a bias frequency magnetic field of amplitude in said recording region comparable to the coercive force of the record medium and which bias frequency magnetic field is superimposed on said signal field to assist in said recording operation.

14. A magnetic transducer system comprising a magnetic head comprising a magnetic core with a pair of poles, said poles having coupling means for coupling of the magnetic core with a magnetic record medium moving along a record medium path, said magnetic head having a cross field loop magnetic flux path threading one of said poles and intersecting the record medium path adjacent said coupling means, electrically conductive path means coupled with said cross field loop magnetic flux path for magnetic flux interlinkage with the record medium adjacent said coupling means during a transducing operation, and a housing of magnetic material having said magnetic core therein and having an opening for exposing said poles to the record medium path, said housing of magnetic material providing a substantial portion of said loop magnetic flux path and being so disposed and of such permeability as to provide an operative coupling between said electrically conductive path means and said record medium via said cross field loop magnetic flux path substantially contributing to said transducing operation.

15. A magnetic transducer system comprising a magnetic head comprising a magnetic core with a pair of pole pieces and a record medium path extending in coupling relation to said magnetic core, said magnetic core being on one side only of the record medium path and the head consisting essentially of magnetic material located on said one side of the record medium path only, said magnetic core having a recording region of the record medium path adjacent one of the pole pieces and having coupling means for coupling of the magnetic core to a magnetic record medium traveling along the record medium path at said recording region during a recording operation of said head, said head having a cross field loop magnetic flux path threading said one of said pole pieces and said recording region, common electric winding means directly linking both of said pole pieces, and means connected to said electric winding means for energizing the same to produce magnetomotive forces in said pole pieces which are opposed with respect to said coupling means and are operative to produce a cross field magnetic flux threading said loop magnetic flux path of amplitude in said recording region comparable to the coercive force of the record medium, and producing a signal magnetic field between the pole pieces of amplitude in said recording region so as to be recorded on the record medium as it moves through said recording region.

16. A magnetic transducer system comprising a magnetic head comprising a magnetic core with a pair of poles, said poles having coupling means for coupling of said magnetic core with a magnetic record medium moving along a record medium path, said head having a cross field loop magnetic flux path threading one of said poles and intersecting said record medium at a recording region adjacent said coupling means, electrically conductive path means coupled with said cross field loop magnetic flux path for producing a magnetic cross field in said recording region, said magnetic core having a member of magnetic material providing a substantial portion of said cross field loop magnetic flux path and being disposed on the opposite side of the record medium path from said poles, and a magnetic structure encircling said magnetic core and extending from a region adjacent the record medium path to a region adjacent the portion of the magnetic core remote from said poles, said magnetic structure and said member of magnetic material being so disposed and of such permeability as to provide an amplitude of said magnetic cross field in said recording region at least of the order of the coercive force of the record medium.

17. A transducer system comprising a magnetic transducer head having a record medium path thereacross and including a pair of magnetic pole faces and a housing for said head including a magnetically permeable surface having an aperture exposing said magnetic pole faces, said pole faces and said surface being in the plane of the record medium path for contact with a record medium moving along said path, said magnetically permeable surface being provided by a ferrite material, and means for establishing a magnetic flux of substantial amplitude at least of the order of the coercive force of the record medium between at least one of said pole faces and said magnetically permeable surface, the housing providing a substantial return path for said magnetic flux.

18. A transducer system comprising a magnetic transducer head comprising a magnetically permeable housing part having an opening and having two magnetic pole pieces extending into said opening for coupling with a record medium traveling across said opening at the exterior side of said housing part, means for establishing a magnetomotive force component from one pole piece to the other, and means for establishing a magnetomotive force component of substantial amplitude at least of the order of the coercive force of the record medium between both pole pieces and the magnetically permeable housing part.

19. A transducer system comprising a transducer head comprising a magnetic core of ring configuration having two and only two longitudinally spaced pole pieces defining a gap for coupling of the head to a record medium and having an adjacent magnetic structure, said head having a pair of unsymmetrical windings coupled to the respective pole pieces in opposing relation, and means comprising said windings for providing a magnetomotive force component of substantial magnitude between said pole pieces to produce a magnetic recording field component acting on the record medium adjacent said gap with an amplitude exceeding the coercive force of the record medium and providing simultaneously a magnetomotive force component of substantial magnitude between the pole pieces and said adjacent magnetic structure to produce a magnetic cross field component acting on the record medium adjacent the gap with an amplitude at least of the order of the coercive force of the record medium.

References Cited

UNITED STATES PATENTS

| | | | |
|---|---|---|---|
| 3,262,124 | 7/1966 | Johnson et al. | 179—100.2 |
| 2,628,285 | 2/1953 | Camras | 179—100.2 |
| 2,803,708 | 8/1957 | Camras | 179—100.2 |
| 2,868,889 | 1/1959 | Patterson | 179—100.2 |
| 3,255,307 | 6/1966 | Schuller | 178—6.6 |
| 3,304,370 | 2/1967 | Johnson | 179—100.2 |

TERRELL W. FEARS, Primary Examiner

J. R. GOUDEAU, Assistant Examiner

U.S. Cl. X.R.

340—174.1; 346—74

UNITED STATES PATENT OFFICE

CERTIFICATE OF CORRECTION

Patent No. 3,513,265 Dated May 19, 1970

Inventor(s) Marvin Camras

It is certified that error appears in the above-identified patent and that said Letters Patent are hereby corrected as shown below:

In the specification, column 5, line 26 after "component" please insert the following, --75 is connected to the winding 41 so as to produce a signal magnetic field--; lines 26, 27, please delete "may be reversed by suitable produce a signal magnetic field across the gap 37--. Column 8, line 72, "may" should be omitted; line 74, "Serial No. 401,382" should read --Serial No. 401,832--; line 75, "the" (third occurrence) should be omitted.

Signed and sealed this 10th day of August 1971.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 60376-P69
U.S. GOVERNMENT PRINTING OFFICE : 1969 O—366-334